US012399760B2

(12) United States Patent
Barnum et al.

(10) Patent No.: US 12,399,760 B2
(45) Date of Patent: Aug. 26, 2025

(54) TECHNIQUES FOR UTILIZING DISRUPTIONS TO ENTERPRISE SYSTEMS

(71) Applicant: Capital One Services, LLC, McLean, VA (US)

(72) Inventors: Eric K. Barnum, Midlothian, VA (US); Bryan Pinos, Williamsburg, VA (US); Lindsay Helbing, Newport News, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/501,690

(22) Filed: Oct. 14, 2021

(65) Prior Publication Data

US 2022/0035691 A1 Feb. 3, 2022

Related U.S. Application Data

(62) Division of application No. 16/730,258, filed on Dec. 30, 2019, now abandoned.

(51) Int. Cl.
*G06F 11/00* (2006.01)
*G06F 11/362* (2025.01)
*G06F 3/06* (2006.01)
*G06Q 10/0639* (2023.01)

(52) U.S. Cl.
CPC ........ *G06F 11/008* (2013.01); *G06F 11/3644* (2013.01); *G06F 3/0629* (2013.01); *G06Q 10/06395* (2013.01)

(58) Field of Classification Search
CPC .... G06F 11/008; G06F 11/2273; G06F 30/20; G06F 11/3055; G06F 11/0793
See application file for complete search history.

(56) References Cited

U.S. PATENT DOCUMENTS

| | | | |
|---|---|---|---|
| 6,502,131 B1 | 12/2002 | Vaid et al. | |
| 7,200,525 B1 * | 4/2007 | Williams | G06F 11/008 714/E11.02 |
| 7,292,531 B1 | 11/2007 | Hill | |
| 7,324,553 B1 | 1/2008 | Varier | |
| 7,457,870 B1 | 11/2008 | Lownsbrough | |

(Continued)

*Primary Examiner* — Loan L.T. Truong
(74) *Attorney, Agent, or Firm* — KDW Firm PLLC

(57) ABSTRACT

Various embodiments are generally directed to techniques for utilizing disruptions to enterprise systems, such as to test and/or improve the ability of the enterprise system to recover from system failures, for instance. In many embodiments, an enterprise system may include two or more networked components, such as hardware components and software components. Some embodiments are particularly directed to generating a disruption scheme for an enterprise system based on analysis of one or more aspects of the enterprise system. For example, embodiments may include one or more of planning, scheduling, creating, timing, implementing, administering, and/or strengthening against a disruption to an enterprise system in a controlled and monitored manner. In many embodiments, administration of a disruption scheme may be monitored, recorded, and/or analyzed. In many such embodiments, a library of disruption events may be generated based on monitoring, recording, and/or analyzing implementation of the disruption scheme.

20 Claims, 9 Drawing Sheets

(56) References Cited

U.S. PATENT DOCUMENTS

| | | | |
|---|---|---|---|
| 7,467,333 B2* | 12/2008 | Keeton | G06F 11/261 714/41 |
| 7,536,595 B1* | 5/2009 | Hiltunen | G06F 11/0793 714/26 |
| 7,543,052 B1 | 6/2009 | Cesa Klein | |
| 7,742,406 B1 | 6/2010 | Muppala | |
| 7,890,813 B2* | 2/2011 | Usynin | G06F 11/2252 702/182 |
| 7,925,756 B1 | 4/2011 | Riddle | |
| 8,700,360 B2* | 4/2014 | Garimella | F02D 41/0072 701/108 |
| 9,753,826 B2* | 9/2017 | Deng | G06F 11/3414 |
| 9,906,578 B2 | 2/2018 | Aliminati | |
| 10,679,133 B1* | 6/2020 | Mathur | G06N 5/02 |
| 10,986,013 B1* | 4/2021 | Theimer | G06F 11/3466 |
| 11,080,157 B1* | 8/2021 | Roberts | G06F 11/263 |
| 11,301,350 B1* | 4/2022 | Byrne | G06F 11/263 |
| 2004/0243882 A1* | 12/2004 | Zhou | G06F 11/36 714/38.1 |
| 2007/0038838 A1* | 2/2007 | Greis | G06F 11/008 711/207 |
| 2008/0215925 A1* | 9/2008 | Degenaro | G06F 11/263 714/41 |
| 2009/0182794 A1* | 7/2009 | Sekiguchi | G06F 11/079 714/39 |
| 2010/0058120 A1* | 3/2010 | Coleman | G06F 3/0481 714/57 |
| 2011/0214112 A1* | 9/2011 | Vidal | G06F 8/65 714/48 |
| 2014/0172371 A1* | 6/2014 | Zhu | G06F 11/0703 702/185 |
| 2015/0161025 A1* | 6/2015 | Baset | G06F 11/2028 714/38.1 |
| 2015/0378859 A1* | 12/2015 | Jang | G06F 11/263 714/41 |
| 2016/0105353 A1 | 4/2016 | Cociglio | |
| 2018/0060221 A1* | 3/2018 | Yim | G06F 11/3692 |
| 2018/0089011 A1* | 3/2018 | Basiri | G06F 9/5077 |
| 2018/0114126 A1* | 4/2018 | Das | G06F 16/335 |
| 2018/0114271 A1* | 4/2018 | Jhoney | G06F 11/0751 |
| 2018/0337828 A1* | 11/2018 | Cohen | G06F 16/25 |
| 2019/0044790 A1* | 2/2019 | Dickens | H04L 41/069 |
| 2019/0095298 A1* | 3/2019 | Fricano | G06F 11/2252 |
| 2019/0158408 A1 | 5/2019 | Li | |
| 2019/0205233 A1* | 7/2019 | Jung | G06F 11/263 |
| 2019/0342146 A1* | 11/2019 | Magcale | G06F 11/079 |
| 2020/0057106 A1* | 2/2020 | Balasubramanian | H03M 1/1076 |
| 2020/0073744 A1* | 3/2020 | Huang | G06F 11/0748 |
| 2020/0106741 A1 | 4/2020 | Fandli | |
| 2020/0241985 A1* | 7/2020 | Zhang | G06F 11/221 |

* cited by examiner

100

200

300

400

500A

500B

600

700

TECHNIQUES FOR UTILIZING DISRUPTIONS TO ENTERPRISE SYSTEMS

RELATED APPLICATIONS

This application is a division of U.S. patent application Ser. No. 16/730,258, titled "TECHNIQUES FOR UTILIZING DISRUPTIONS TO ENTERPRISE SYSTEMS" filed on Dec. 30, 2019. The contents of the aforementioned application are incorporated herein by reference in their entirety.

BACKGROUND

Generally, a computer network is a digital telecommunications network which allows nodes, or components, to share resources. In computer networks, computing devices exchange data with each other using connections between nodes via various transmission media, such as via wired or wireless mediums. Interruptions or delays in the exchange of data may result from software and/or hardware disruptions. Computer networks can support a large number of applications and services such as access to the World Wide Web, digital video, digital audio, and shared use of application and storage servers. The amount of data moving across a computer network may be referred to as traffic. Typically, network data in computer networks is encapsulated in network packets, which provide the traffic load in the network. Generally, traffic management may include one or more of network traffic control, network traffic measurement, network traffic simulation, network traffic modeling, and network configuration.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a memory comprising instructions that when executed by the processor cause the processor to perform operations comprising one or more of: identify a configuration of an enterprise system, the enterprise system comprising a plurality of hardware components and a plurality of software components, wherein at least a portion of the plurality of hardware components implement the plurality of software components; determine one or more targets in the enterprise system to disrupt, the one or more targets comprising at least one of a hardware component of the plurality of hardware components or a software component of the plurality of software components; identify one or more disruptions to apply to each of the one or more targets, wherein each of the one or more disruptions affect operation of at least one of the one or more targets in the enterprise system; determine one or more conditions for each of the one or more disruptions to apply to each of the one or more targets; analyze at least one of the one or more targets, the one or more disruptions, and the one or more conditions to determine one or more timings for the one or more disruptions; generate a disruption scheme for the enterprise system based on the one or more targets, the one or more disruptions, the one or more conditions, and the one or more timings; and implement the disruption scheme on the enterprise system to test resiliency of the enterprise system. In some embodiments, at least one of the one or more timings for the one or more disruptions may comprise a disruption window to minimize impact on user experience associated with the enterprise system. In many embodiments, at least one of the one or more timings for the one or more disruptions may comprise a disruption window to maximize impact of the disruption scheme on user experience associated with the enterprise system. In several embodiments, the memory may comprise instructions that when executed by the processor cause the processor to monitor the one or more disruptions and one or more responses to the one or more disruptions and create at least one disruption event in a library based on monitoring the one or more disruptions and the one or more responses to the one or more disruptions. In one or more embodiments, each of the at least one disruption event created in the library may comprise two or more of a system state timeline, a response timeline, and a configuration timeline. In various embodiments, the memory may comprise instructions that when executed by the processor cause the processor to determine at least one of the one or more targets in the enterprise system to disrupt, the one or more disruptions to affect operation of at least one of the one or more targets, and the one or more conditions based on user input. In some embodiments, the one or more conditions may comprise a scope for the one or more disruptions, wherein the scope of the one or more disruptions comprises a threshold amount of or elapsed time with affected hardware components and affected software components in the enterprise system. In some such embodiments, the memory may comprise instructions that when executed by the processor cause the processor to return the enterprise system to a previous configuration when the scope of the one or more disruptions is exceeded.

One or more embodiments described herein may include at least one non-transitory computer-readable medium comprising a set of instructions that, in response to being executed by a processor circuit, cause the processor circuit to perform operations comprising one or more of: determine one or more targets in an enterprise system to disrupt, the one or more targets comprising at least one of a hardware component of a plurality of hardware components in the enterprise system and a software component of a plurality of software components in the enterprise system, wherein at least a portion of the plurality of hardware components implement the plurality of software components; identify one or more disruptions to apply to each of the one or more targets, wherein each of the one or more disruptions affect operation of at least one of the one or more targets in the enterprise system; determine one or more conditions for each of the one or more disruptions to apply to each of the one or more targets; analyze at least one of the one or more targets, the one or more disruptions, and the one or more conditions to determine one or more timings for the one or more disruptions; create a disruption scheme for the enterprise system based on the one or more targets, the one or more disruptions, the one or more conditions, and the one or more timings; implement the disruption scheme on the enterprise system to test resiliency of the enterprise system; monitor the one or more disruptions and one or more responses to the one or more disruptions; and create at least one disruption event in a library based on monitoring the one or more disruptions and the one or more responses to the one or more disruptions. In various embodiments, at least one of the one or more timings for the one or more disruptions may comprise a disruption window to minimize impact on user experience associated with the enterprise system. In many embodiments, at least one of the one or more timings for the one or more disruptions may comprise a disruption window to maximize impact of the disruption scheme on the enterprise system. In several embodiments, each of the at least one disruption event created in the library may comprise two or more of a system state timeline, a response timeline, and a configuration timeline. Various embodiments may comprise instructions that, in response to being executed by the processor circuit, cause the processor circuit to determine at least one of the one or more targets in the enterprise system to disrupt, the one or more disruptions to affect operation of at least one of the one or more targets, and the one or more conditions based on user input. In one or more embodiments, the one or more conditions may comprise a scope of the one or more disruptions, wherein the scope for the one or more disruptions comprises a threshold amount of or elapsed time with affected hardware components and affected software components in the enterprise system. One or more such embodiments may comprise instructions that, in response to being executed by the processor circuit, cause the processor circuit to interrupt the one or more disruptions when the scope of the one or more disruptions is exceeded.

Several embodiments described herein may include a computer-implemented method, comprising one or more of: determining a configuration of an enterprise system, the enterprise system comprising a plurality of hardware components and a plurality of software components, wherein at least a portion of the plurality of hardware components implement the plurality of software components; identifying one or more targets in the enterprise system to disrupt, the one or more targets comprising at least one of a hardware component of the plurality of hardware components or a software component of the plurality of software components; determining one or more disruptions to apply to each of the one or more targets, wherein each of the one or more disruptions affect operation of at least one of the one or more targets in the enterprise system; identifying one or more conditions for each of the one or more disruptions to apply to each of the one or more targets; analyzing at least one of the one or more targets, the one or more disruptions, and the one or more conditions to determine one or more timings for the one or more disruptions; creating a disruption scheme for the enterprise system based on the one or more targets, the one or more disruptions, the one or more conditions, and the one or more timings; and implementing the disruption scheme on the enterprise system to test resiliency of the enterprise system. In some embodiments, at least one of the one or more timings for the one or more disruptions may comprise a disruption window to minimize impact on user experience associated with the enterprise system. In various embodiments, at least one of the one or more timings for the one or more disruptions may comprise a disruption window to maximize impact of the disruption scheme on the enterprise system. Several embodiments may comprise monitoring the one or more disruptions and one or more responses to the one or more disruptions and creating at least one disruption event in a library based on monitoring the one or more disruptions and the one or more responses to the one or more disruptions. In several such embodiments, each of the at least one disruption event created in the library may comprise two or more of a system state timeline, a response timeline, and a configuration timeline.

BRIEF DESCRIPTION OF THE DRAWINGS

FIG. 5C illustrates a third exemplary logic flow according to one or more embodiments described herein.

DETAILED DESCRIPTION

Figure 1:
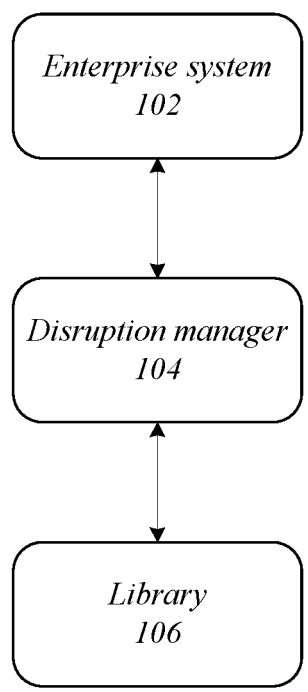
FIG. 1 illustrates a first exemplary operating environment for a disruption manager according to one or more embodiments described herein.

Various embodiments are generally directed to techniques for utilizing disruptions to enterprise systems, such as to test and/or improve the ability of the enterprise system to recover from system failures, for instance. In many embodiments, an enterprise system may include two or more networked components, such as hardware components and software components. Some embodiments are particularly directed to generating a disruption scheme for an enterprise system based on analysis of one or more aspects of the enterprise system. For example, embodiments may include one or more of planning, scheduling, creating, timing, implementing, administering, and/or strengthening against a disruption to an enterprise system in a controlled and monitored manner. In many embodiments, administration of a disruption scheme may be monitored, recorded, and/or analyzed. In many such embodiments, a library of disruption events may be generated based on monitoring, recording, and/or analyzing implementation of the disruption scheme. In several embodiments, the library of disruption events may be utilized to respond to future disruptions. These and other embodiments are described and claimed.

Some challenges facing enterprise systems include numerous networked components (e.g., hardware and/or software components) that may unexpectedly fail or be compromised, such as due to overloading or malicious actors. For example, an enterprise system may include a set of networked servers that provide software services to users (e.g., via an application programming interface). In such examples, hardware and/or software executing on the hardware may fail without warning, leading to delays or interruptions in service. Adding further complexity, hardware and/or software components in an enterprise system may have intricate configurations with complex interdependencies. Oftentimes these configuration intricacies and interdependencies mean that failure of one component can lead to numerous and unanticipated failures in other components of the enterprise system. For instance, failure of a network switch may prevent communication with a server or database in the enterprise system. In another instance, failure of a server may cause software executing on the server to crash. In yet another instance, failure of a first component may cause too much traffic to be routed to a second component, causing the second component to fail. Further, simulating disruptions may not trigger these unanticipated failures because simulations cannot account for all possible real-world situations. These and other factors may result in unreliable systems with limited resiliency, resulting in poor user experiences, reduced quality of service, limited functionality, and unnecessary downtime. Such limitations can drastically reduce the appeal of products, systems, and/or services offered via an enterprise system, contributing to lost revenues, limited adaptability, and reduced usability.

Various embodiments described herein include techniques and devices for planning, creating, administering, and/or monitoring disruptions to an enterprise system to improve resiliency of the enterprise system. In many embodiments, a disruption scheme may be generated and/or customized for an enterprise system based on one or more of component configurations, target components, disruptions, conditions, and timings. For example, a disruption manager may generate a disruption scheme to overload a first target component in an enterprise system when a condition associated with a second component of the enterprise system is fulfilled within a predetermined window of time. In many such embodiments, disruption schemes may be implemented to test the resiliency and/or identify weaknesses in the enterprise system. In various embodiments, one or more aspects of implementing the disruption scheme may be managed or controlled to limit or rollback unintended consequences of implementing the disruption scheme. In several embodiments, implementation of disruption schemes may be monitored and/or used to build a library of disruptions events. In several such embodiments, the library of disruption events may include actions taken to quickly and efficiently remedy a disruption. In one or more embodiments, monitoring implementation of disruption schemes and/or generating the library of disruption events may be used to improve resiliency of the enterprise system against future disruptions. One or more of these components and/or techniques may be used as part of a novel process to utilize disruptions to enterprise systems to improve reliability and/or resiliency of enterprise systems.

One or more techniques described herein may enable increased adaptability, usability, and appeal of products, systems, and/or services offered via enterprise systems, promoting improved products, systems, and/or services and leading to better functionality and increased convenience. In these and other ways, components/techniques described here may identify methods to increase efficiency, decrease disruptions, improve user experiences, strengthen enterprise systems, and/or effectively evaluate components, configurations, and interdependences in enterprise systems, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve one or more technical fields including enterprise systems, system evaluation, system testing, system strengthening, user interactions, disruption implementation, disruption monitoring, and/or disruption recovery.

In several embodiments, components described herein may provide specific and particular manners of utilizing disruptions to enterprise systems, such as planning, scheduling, creating, timing, implementing, administering, and/or strengthening against a disruption to an enterprise system a controlled and monitored manner. In several such embodiments, the specific and particular manners may include, for instance, one or more of identifying a configuration of an enterprise system, determining one or more targets in the enterprise system to disrupt, identifying one or more disruptions to apply to each of the one or more targets, determining one or more conditions for each of the one or more disruptions, analyzing the one or more targets, the one or more disruptions, and the one or more conditions to determine one or more timings for the one or more disruptions, generating a disruption scheme for the enterprise system based on the one or more targets, the one or more disruptions, the one or more conditions, and the one or more timings, implementing the disruption scheme, monitoring implementation of the disruption scheme, creating one or more disruption events in a library based on monitoring implementation of the disruption scheme, and hardening the enterprise system against future disruptions based on the library and/or monitoring implementation of the disruption scheme. In many embodiments, one or more of the components described herein may be implemented as a set of rules that improve computer-related technology by allowing a function not previously performable by a computer that enables an improved technological result to be achieved. For example, the function allowed may include one or more aspects of enterprise systems, system evaluation, system testing, system strengthening, user interactions, disruption implementation, disruption monitoring, and/or disruption recovery described herein.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 for a disruption manager 104 according to one or more embodiments described herein. Operating environment 100 may include an enterprise system 102, disruption manager 104, and library 106. In the illustrated embodiments, disruption manager 104 is communicatively coupled to enterprise system 102 and library 106. In one or more embodiments described herein, the disruption manager 104 may test and/or improve the ability of the enterprise system 102 to recover from disruptions to one or more components of the enterprise system 102. For example, disruption manager 104 may plan, schedule, create, implement, administer, and/or strengthening against disruptions to enterprise system 102 in a controlled and monitored manner. In many embodiments, library 106 may be generated based on monitoring, recording, and/or analyzing implementation of the disruption scheme. In some embodiments, library 106 may include one or more actions associated with remedying a disruption to the enterprise system 102. Embodiments are not limited in this context.

In several embodiments, enterprise system 102 may provide one or more platforms to implement components, such as one or more applications and/or services. In various embodiments, components of the enterprise system 102 may comprise (e.g., be utilized to implement or host) one or more of an application programming interface (API), a database, an application, a service, a technique, and one or more functionalities described herein. For example, components of enterprise system 102 may include hardware and software components. In such examples, one or more hardware components (e.g., a server) may be used to implement one or more software components (e.g., an API). In many embodiments, components of enterprise system 102 may include one or more resources, services, components, applications, systems, capabilities, and functionalities described herein. In some embodiments, enterprise system 102 may comprise disruption manager 104 and/or library 106.

In one or more embodiments, the enterprise system 102 may comprise, or be comprised in, a computer network that includes physical resources and/or cloud resources. In various embodiments, physical resources may include physical hardware that are directly controlled, employed, and/or owned by an entity that provides the services and or applications implemented by the enterprise system 102. In many embodiments, cloud resources may refer to a pool of hardware that is utilized to provide computational or data services to the entity without the entity having physical access or control over the hardware providing the computational or data services. For example, cloud resources may include computational or data services utilized (e.g., under a rental agreement) by the entity independent of the underlying hardware.

As previously mentioned, the disruption manager 104 may test and/or improve the ability of the enterprise system 102 to recover from disruptions to one or more components of the enterprise system 102. In one or more embodiments, disruption manager 104 may plan, schedule, create, implement, administer, and/or strengthening against disruptions to enterprise system 102 in a controlled and monitored manner. In some embodiments, the resiliency (e.g., ability of a network to recover from failure without impairing end user experience, system integrity, or other measures) of the network as a whole and/or of particular components, applications, or subsets thereof, including a database, an object, an application layer, cloud equivalents of physical networks devices, such as firewall devices or routers, and the like.

Oftentimes, the disruption manager 104 may determine one or more timings (e.g., time windows) to perform operations, such as disruptions, that will minimize impact to the enterprise system 102, such as a shortest time window to maximize operational objectives and/or extent of disruption before affecting parallel operations (e.g., user facing functionality). For example, tests may be scheduled and/or performed during periods projected to have low traffic. In one or more embodiments, the disruption manager 104 may determine one or more timings (e.g., time windows) to perform operations, such as disruptions, that will maximize impact to the enterprise system 102. In some embodiments, a timing may include a start time and an end time. In various embodiments the disruption manager 104 may heal the enterprise system 102 if one or more timings are exceeded. For example, the disruption manager 104 may reverse one or more disruptions and/or return the enterprise system to a previous configuration when a timing is exceeded. In some embodiments, disruption manager 104 may generate one or more alerts if one or more timings are exceeded. For instance, disruption manager 104 may alert users and/or administrators when one or more timings are exceeded.

In various embodiments, the disruption manager 104 may include, or be integrated with, the ability to visualize the enterprise system 102 from the largest to the smallest scales, disrupt select portions/aspects/functionalities/components of the enterprise system, repair/configure the enterprise system 102 in response to the disruption, and utilize data associated with one or more of the enterprise system 102 visualization, the disruption, and the response to improve one or more aspects of the enterprise system 102, disruption manager 104, and/or library 106. In many embodiments, the disruption manager 104 may include, or be integrated with, a visualization and control tool for enterprise system 102.

Accordingly, disruption manager 104 may include, or operate in conjunction with, the ability to control traffic and other attributes, such as health status checks of individual cloud assets like an elastic load balancer. Further, these and other abilities of disruption manager 104 may provide the capability to initiate and/or control a disruption within a tool that visualizes and/or controls resiliency. This may enable a cleaner picture of the disruption, and effects thereof (e.g., what is struggling/failing, and where in an interdependent system chain, the actual problems are). Furthermore, embedding and controlling the disruption within this tool may allow reliable restoration of service and capture of lessons learned. In many embodiments, the lessons may be generated using machine learning. In several embodiments, lessons learned may be stored in library 106.

In many embodiments, library 106 may be generated based on developing, implementing, monitoring, recording, responding to, and/or analyzing disruption schemes. In several embodiments, the library 106 may include a plurality of disruption event records with each respective record comprising data associated with developing, implementing, monitoring, recording, responding to, and/or analyzing a respective disruption scheme. In some embodiments, library 106 may include one or more actions associated with remedying a disruption to the enterprise system 102. In some such embodiments, the one or more actions associated with remedying a disruption may be utilized to improve resiliency during unanticipated/unforeseen disruption events. In many embodiments, library 106 may include disruption schemes, such as schedules, tactics, targets, and the like. In one or more embodiments, the library 106 may include one or more timelines associated with a disruption event. For example, library 106 may include one or more of a configuration timeline, a system state timeline, and a response timeline associated with each disruption event record.

In some embodiments, the configuration of components in environment 100 may be altered without departing from the scope of this disclosure. For example, library 106 may be included in disruption manager 104. In another example, disruption manager 104 may be included in a network manager. In yet another example, the disruption manager 104 and/or library 106 may be included in, or implemented on, one or more components of the enterprise system 102.

Figure 2:
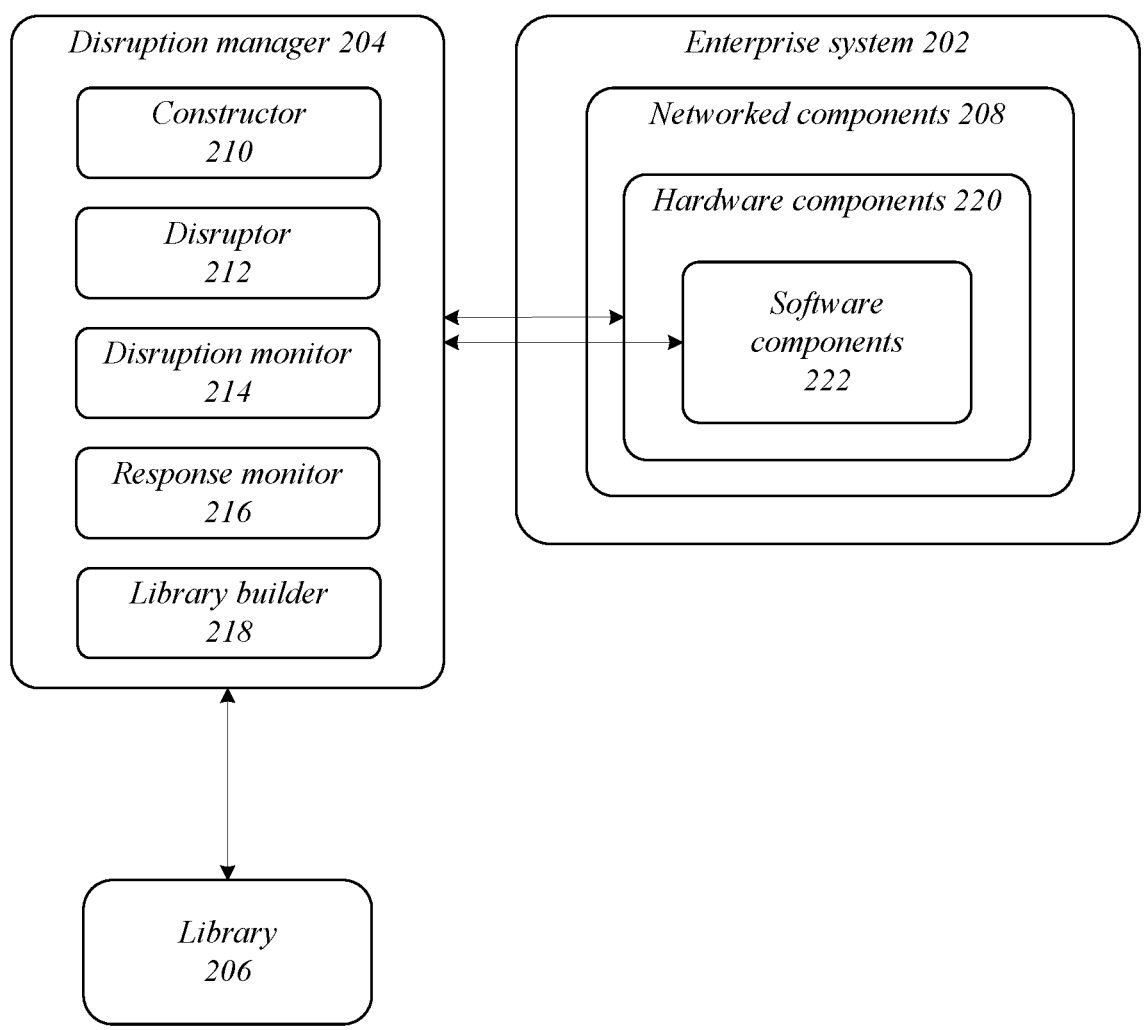
FIG. 2 illustrates exemplary aspects of a disruption manager in conjunction with an enterprise system according to one or more embodiments described herein.

FIG. 2 illustrates exemplary aspects of a disruption manager 204 in conjunction with an enterprise system 202 in environment 200, according to one or more embodiments described herein. Operating environment 200 may include enterprise system 202, disruption manager 204, and library 206. In some embodiments, environment 200 may include one or more components that are the same or similar to one or more other components described herein. For example, enterprise system 202, disruption manager 204, and/or library 206 may be the same or similar to enterprise system 102, disruption manager 104, and/or library 106, respectively. In operating environment 200, disruption manager 204 may include constructor 210, disruptor 212, disruption monitor 214, response monitor 216, and library builder 218. Further, enterprise system 202 may include a set of network components 208 that includes a set of hardware components 220 (or hardware resources) that implement a set of software components 222. Embodiments are not limited in this context.

In several embodiments, constructor 210 may develop a disruption scheme to test one or more operational aspects of enterprise system 202. In several such embodiments, developing a disruption scheme may include one or more of planning, designing, creating, scheduling, and/or organizing a disruption. For example, constructor 210 may identify a disruption target, develop a disruption for the target, and schedule a window for the disruption to the carried out. In one or more embodiments, constructor 210 may develop one or more aspects of a disruption scheme based on user input.

In many embodiments, constructor 210 may perform one or more of the following: determining a configuration of components in enterprise system 202; identifying one or more targets in the enterprise system to disrupt, the one or more targets comprising at least one hardware component or software component; determining one or more disruptions to apply to each of the one or more targets, wherein each of the one or more disruptions affect operation of at least one of the one or more targets in the enterprise system; identifying one or more conditions for each of the one or more disruptions to apply to each of the one or more targets; analyzing at least one of the one or more targets, the one or more disruptions, and the one or more conditions to determine one or more timings for the one or more disruptions; and creating a disruption scheme for the enterprise system based on the one or more targets, the one or more disruptions, the one or more conditions, and the one or more timings.

In some embodiments, constructor 210 may utilize data in library 206 to develop a disruption scheme. In many embodiments, constructor 210 may utilize one or more configurations, settings, and characteristics of the enterprise system 202, or components thereof, to develop a disruption scheme. In many such embodiments, constructor 210 may identify or determine the configurations, settings, and/or characteristics of the enterprise system 202 via analysis of the enterprise system 202 or data associated therewith (e.g., log files, system files, etc.). In various embodiments, disruptions may affect operation of at least one object (e.g., component, pathway, etc.) in the enterprise system. For example, disruptions may include, or simulate, complete, partial, and/or pending failure. In some embodiments, disruptions may be designed to affect various operational aspects of objects according to a percentage of normal or target operation. For example, a disruption may include increasing traffic by 2000%, decreasing throughput by 87%, and/or responsiveness by 63%. In various embodiments, operational aspects of objects may be set to a target value to implement disruptions.

In one or more embodiments, disruptor 212 may implement a disruption scheme, such as one developed by constructor 210. In various embodiments, disruption monitor 214 may monitor characteristics of the enterprise system 202 during implementation of a disruption. In many embodiments, response monitor 216 may monitor responses implemented in enterprise system 202 to remedy the disruption. In various embodiments, library builder 218 may identify and/or store disruption data, such as data associated with developing a disruption scheme, implementing the disruption scheme, monitoring implementation of the disruption scheme, and/or monitoring responses to implementation of the disruption scheme. In various embodiments, library builder 218 may analyze disruption data and only store relevant disruption data in library 206. For example, library builder 218 may only store data associated with effective responses to a disruption in the library 206. In one or more embodiments, disruption manager 204 may analyze data in library 206 to determine future disruptions and/or responses thereto. In one or more such embodiments, disruption manager 204 may utilize machine learning to analyze data in library 206 to determine future disruptions and/or responses thereto.

As previously mentioned, in various embodiments, components of the enterprise system 102 may comprise (e.g., be utilized to implement or host) one or more of an application programming interface (API), a database, an application, a service, a technique, and one or more functionalities described herein. In many embodiments, one or more components of enterprise system 202 may change. In many such embodiments, the components in various components sets of enterprise system 202 may dynamically change. In some embodiments, enterprise system 202 may include one or more cloud components that change. For example, one or more hardware components implementing a software component may change, such as due to load balancing.

Figure 3:
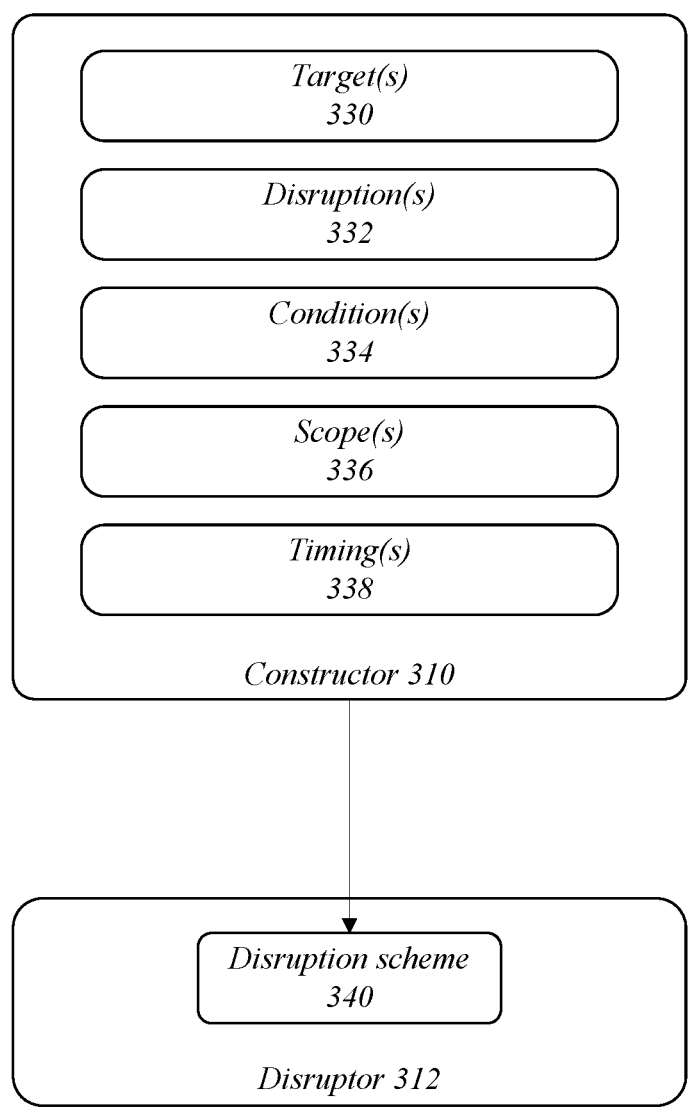
FIG. 3 illustrates exemplary aspects of a constructor in conjunction with a disruptor according to one or more embodiments described herein.

FIG. 3 illustrates exemplary aspects of a constructor 310 in conjunction with disruptor 312 in environment 300, according to one or more embodiments described herein. In some embodiments, environment 300 may include one or more components that are the same or similar to one or more other components described herein. For example, constructor 310 and/or disruptor 312 may be the same or similar to constructor 210 and/or disruptor 212, respectively. In operating environment 300, constructor 310 includes one or more targets 330, one or more disruptions 332, one or more conditions 334, one or more scopes 336, and one or more timings 338. Further, disruptor 312 may include disruption scheme 340. In one or more embodiments described herein, constructor 310 may develop the disruption scheme 340 to provide to disruptor 312 based on one or more of target(s) 330, disruption(s) 332, condition(s) 334, scope(s) 336, and timing(s) 338. Embodiments are not limited in this context.

In several embodiments, one or more of the target(s) 330, disruption(s) 332, condition(s) 334, scope 336, and timing(s) 338 may be determined by constructor 310. For example, the timing for implementing a disruption may be determined by constructor 310 using historical operational data of a corresponding enterprise system. In an alternative, or additional, example, constructor 310 may determine one or more of the target(s) 330, disruption(s) 332, condition(s) 334, scope(s) 336, and timing(s) 338 based on user input and/or data in a library (e.g., library 206). In some embodiments, the one or more conditions 334 may include the one or more scopes 336.

In many embodiments, constructor 310 may perform one or more of the following: determining a configuration of components in an enterprise system; identifying one or more targets 330 in the enterprise system to disrupt, the one or more targets comprising at least one hardware component or software component; determining one or more disruptions 332 to apply to each of the one or more targets, wherein each of the one or more disruptions affect operation of at least one of the one or more targets in the enterprise system; identifying one or more conditions 334 for each of the one or more disruptions to apply to each of the one or more targets; determining one or more scopes 336 for the one or more disruptions 332, wherein the scope for the one or more disruptions comprises a threshold amount of or elapsed time with affected hardware components and/or affected software components in the enterprise system; analyzing at least one of the one or more targets 330, the one or more disruptions 332, and the one or more conditions 334 to determine one or more timings 338 for the one or more disruptions 332; and creating disruption scheme 340 for the enterprise system based on the one or more targets 330, the one or more disruptions 332, the one or more conditions 334, and the one or more timings 338.

In many embodiments, constructor 310 may provide the disruption scheme 340 to disruptor 312. In various embodiments, disruptor 312 may implement the disruption scheme 340. In various such embodiments, disruptor 312 may implement the disruption scheme 340 to test resiliency of the enterprise system. In several embodiments, disruption scheme 340 may cause one or more of removal of elastic load balancing stacks, rerouting traffic, blocking traffic, removing traffic routes, suspending health checks, disabling components, simulating traffic, and the like.

In some embodiments, the disruption manager (e.g., disruptor 312) may heal one or more affected components of the enterprise system if one or more conditions 334, scopes 336, and/or timings 338 are violated. In various embodiments, the disruption manager (e.g., disruptor 312) may abort and/or reverse implementation of disruption scheme 340 if one or more conditions 334, scopes 336, and/or timings 338 are violated. For example, disruptor 312 may return the enterprise system to a previous configuration when the threshold amount of affected hardware components and affected software components in the enterprise system is exceeded. In many embodiments, disruptor 312 may determine one or more conditions 334, scopes 336, and/or timings 338 are violated based on data from one or more of disruption monitor 214, response monitor, library 206. In some embodiments, the disruption manager (e.g., disruptor 312) may generate one or more alerts if one or more conditions 334, scopes 336, and/or timings 338 are violated. For instance, disruption manager 104 may alert users and/or administrators when one or more conditions 334, scopes 336, and/or timings 338 are violated.

Figure 4:
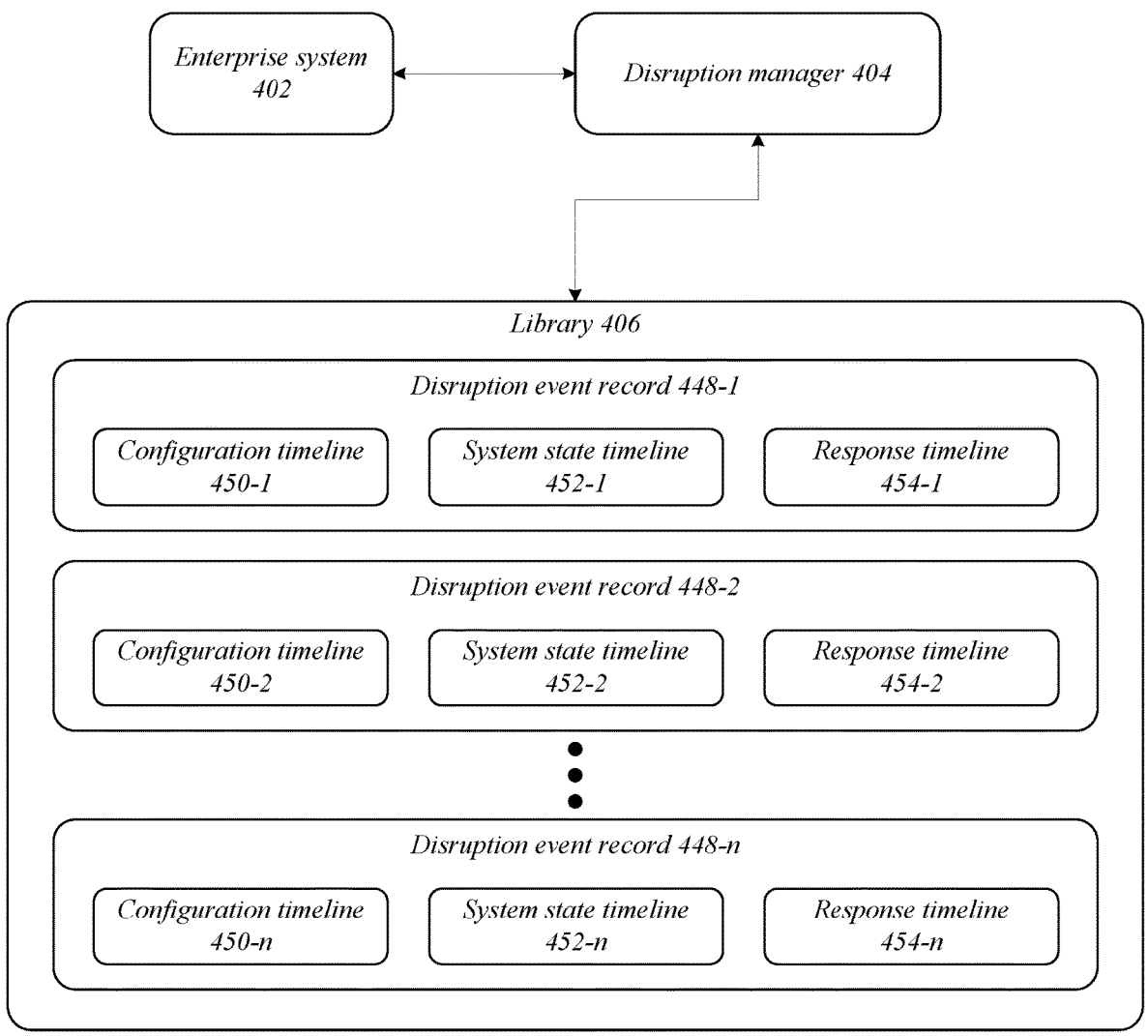
FIG. 4 illustrates an exemplary aspects of a disruption manager in conjunction with a library according to one or more embodiments described herein.

FIG. 4 illustrates exemplary aspects of disruption manager 404 in conjunction with library 406 in environment 400, according to one or more embodiments described herein. Environment 400 includes enterprise system 402, disruption manager 404, and library 406. In some embodiments, environment 400 may include one or more components that are the same or similar to one or more other components described herein. For example, enterprise system 402, disruption manager 404, and/or library 406 may be the same or similar to enterprise system 202, disruption manager 204, and/or library 206, respectively. In operating environment 400, library 406 includes one or more disruption event records 448-1, 448-2, 448-n (or disruption event records 448). Each of the disruption event records 448 may include a configuration timeline 450-1, 450-2, 450-n, a system state timeline 452-1, 452-2, 452-n, and a response timeline 454-1, 454-2, 454-n, respectively. In one or more embodiments described herein, disruption manager 404 may retrieve and store data in library 406 to facilitate one or more functionalities described herein. For instance, disruption manager 404 may generate and store the disruption event records 448 in library 406 based on planning, creating, administering, and/or monitoring disruptions to associated with enterprise system 402. Embodiments are not limited in this context.

In many embodiments, disruption manager 404 may generate disruption event records 448 in library 406 based on disruptions performed pursuant a disruption scheme. In various embodiments, a configuration timeline (e.g., one or more of configuration timelines 450-1, 450-2, 450-n) may refer to or include a mapping of one or more components in enterprise system 402 and how they change over time. For example, a configuration timeline may include a mapping of data sources/destinations for one or more components in enterprise system 402 and how they change. In another, or additional, example, a configuration timeline may include settings of components and how they change. In some embodiments, a configuration timeline may include a mapping of interdependencies between components of enterprise system 402 and how they change.

In several embodiments, a system state timeline (e.g., one or more of system state timelines 452-1, 452-2, 452-n) may refer to or include a mapping of the operational state of one or more components in enterprise system 402 and how they change over time. For example, a system state timeline may include one or more of a health status, a capacity, a bandwidth, a load, a traffic flow, a capacity, and the like of one or more components in enterprise system 402 (and how they change over time). In various embodiments, a system state timeline may map disruptions in the enterprise system 402.

In various embodiments, a response timeline (e.g., one or more of response timelines 454-1, 454-2, 454-n) may refer to or include a mapping of the actions taken overtime in response to disruptions in enterprise system 402. For example, a response timeline may include a mapping of how failover operations occurred in response to a disruption. In another, or additional, example a response timeline may include a mapping of how auxiliary resources were deployed in response to a disruption. In many embodiments, a response timeline may include one or more indication regarding the disruption.

In one or more embodiments described herein, mappings may include nodes and edges wherein each node may represent a software/hardware component and each edge may represent connections between the components, such as data paths. In many embodiments, the nodes and edges may include one or more indicators, states, characteristics, settings, and the like that correspond to the object represented thereby. Although, in the illustrated embodiment, disruption manager 404 generates disruption event records 448 with configuration timelines 450, system state timelines 452, and response timelines 454. In other embodiments, one or more additional or alternative timelines may be created without departing from the scope of this disclosure. For instance, timelines 450-1, 452-1, 454-1, may be generated in a single timeline. In another, or additional, instance, a quality of service timeline may be generated. In yet another, or additional, instance, a disruption timeline may be generated. In yet another, or additional, instance, a disruption scheme implementation timeline may be generated.

Figure 5A:
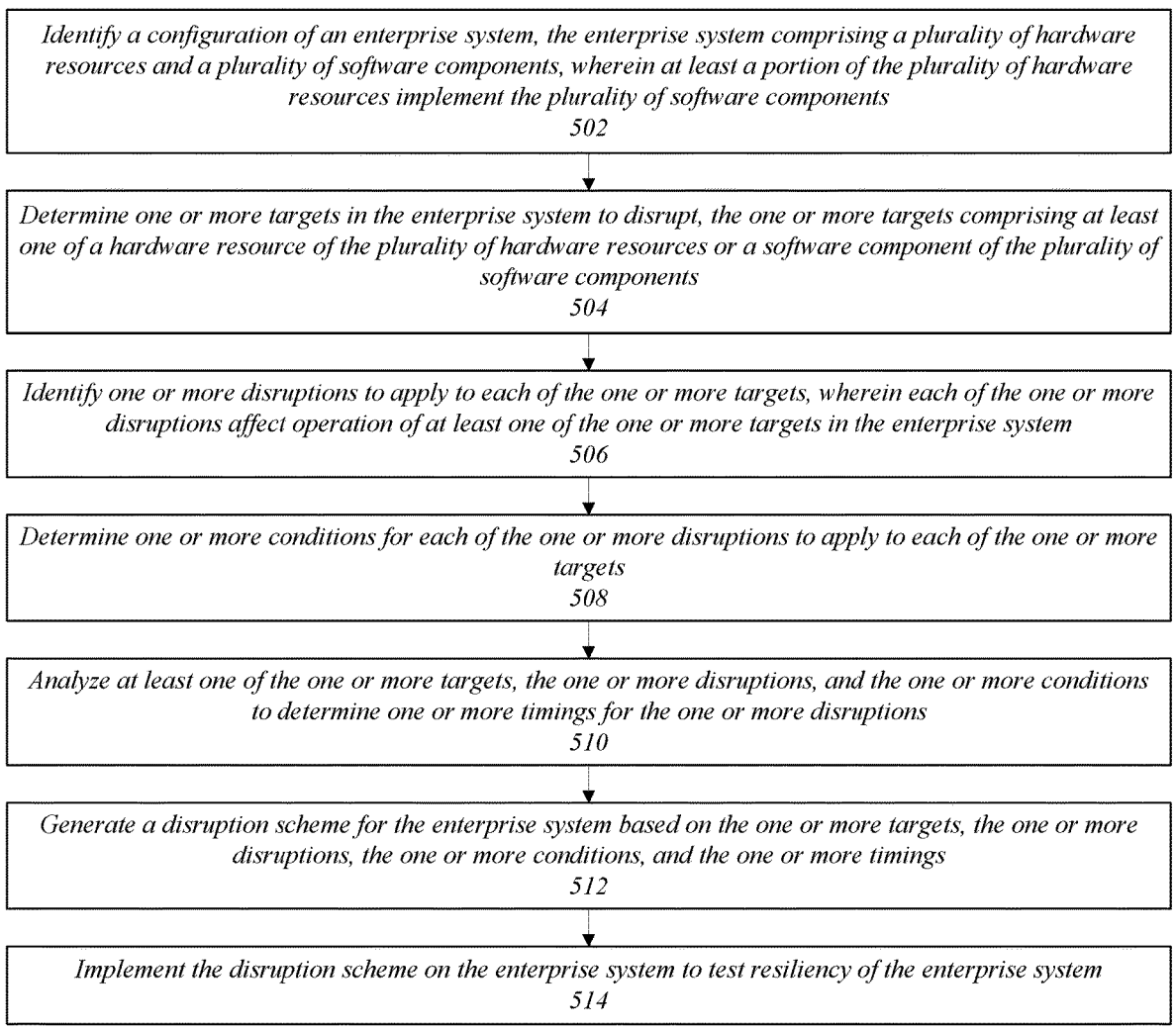
FIG. 5A illustrates a first exemplary logic flow according to one or more embodiments described herein.

FIG. 5A illustrates one embodiment of a logic flow 500A, which may be representative of operations that may be executed in various embodiments in conjunction with techniques for utilizing disruptions to enterprise systems. The logic flow 500A may be representative of some or all of the operations that may be executed by one or more components/devices/environments described herein, such as enterprise system 102, disruption manager 104, and/or library 106. The embodiments are not limited in this context.

In the illustrated embodiments, logic flow 500A may begin at block 502. At block 502 "identify a configuration of an enterprise system, the enterprise system comprising a plurality of hardware resources and a plurality of software components, wherein at least a portion of the plurality of hardware resources implement the plurality of software components" a configuration of an enterprise system may be identified. The configuration may include a plurality of hardware resources and a plurality of software components implemented by at least a portion of the plurality of hardware resources. For example, disruption manager 204 may identify the configuration of hardware components 220 and software components 222 of enterprise system 202. In many such example, the hardware components 220 may implement (e.g., execute) the software components 222.

Referring to block 504 "determine one or more targets in the enterprise system to disrupt, the one or more targets comprising at least one of a hardware resource of the plurality of hardware resources or a software component of the plurality of software components" one or more targets to disrupt in the enterprise system may be determined. For instance, disruption manager 104 may determine a hardware component and a software component of enterprise system 102 to disrupt. Continuing to block 506 "identify one or more disruptions to apply to each of the one or more targets, wherein each of the one or more disruptions affect operation of at least one of the one or more targets in the enterprise system" one or more disruptions to apply to each of the one or more targets may be identified. For example, constructor 310 may identify one or more disruptions 332 to apply to targets 330.

Proceeding to block 508 "determine one or more conditions for each of the one or more disruptions to apply to each of the one or more targets" one or more conditions for each of the one or more disruptions may be determined for application to each of the one or more targets. For instance, constructor 310 may determine one or more conditions 334 for each of the one or more disruptions 332 for application to targets 330. At block 510 "analyze at least one of the one or more targets, the one or more disruptions, and the one or more conditions to determine one or more timings for the one or more disruptions" one or more timings may be determined for the one or more disruptions based on analysis of at least one of the one or more targets, the one or more disruptions, and the one or more conditions. For example, constructor 310 may determine one or more timings 338 based on analysis of at least one of the one or more targets 330, the one or more disruptions 332, and the one or more conditions 334.

Referring to block 512 "generate a disruption scheme for the enterprise system based on the one or more targets, the one or more disruptions, the one or more conditions, and the one or more timings" a disruption scheme for the enterprise system may be generated based on the one or more targets, the one or more disruptions, the one or more conditions, and the one or more timings. For instance, constructor 310 may generate disruption scheme 340 based on the one or more targets 330, the one or more disruptions 332, the one or more conditions 334, and the one or more timings 338. Continuing to block 514 "implement the disruption scheme on the enterprise system to test resiliency of the enterprise system" the disruption scheme may be implemented in the enterprise system to test the resiliency of the enterprise system. For example, disruptor 312 may implement disruption scheme 340 to test the resiliency of enterprise system 202.

Figure 5B:
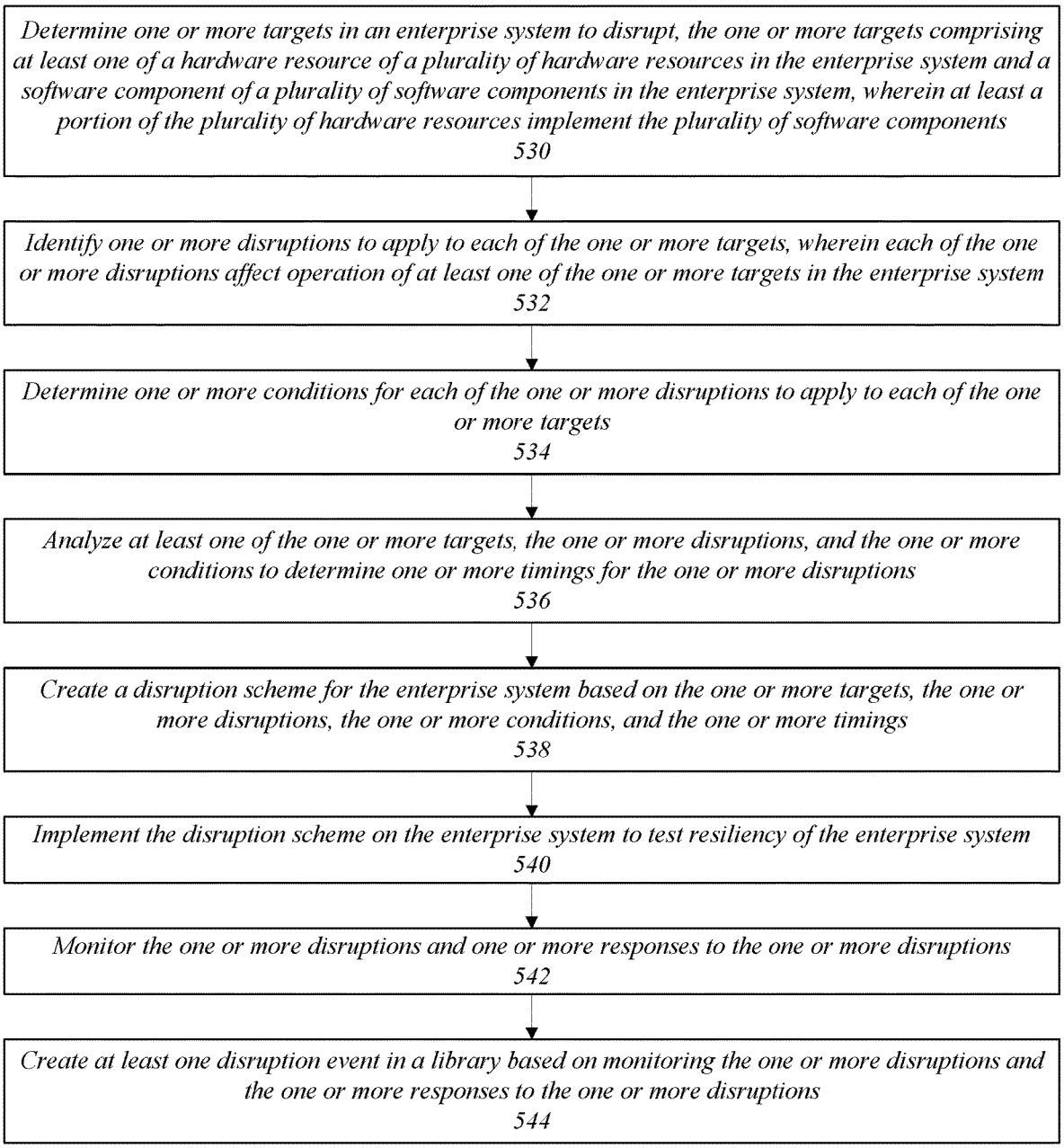
FIG. 5B illustrates a second exemplary logic flow according to one or more embodiments described herein.

FIG. 5B illustrates one embodiment of a logic flow 500B, which may be representative of operations that may be executed in various embodiments in conjunction with techniques for utilizing disruptions to enterprise systems. The logic flow 500B may be representative of some or all of the operations that may be executed by one or more components/devices/environments described herein, such as enterprise system 102, disruption manager 104, and/or library 106. The embodiments are not limited in this context.

In the illustrated embodiments, logic flow 500B may begin at block 530. At block 530 "determine one or more targets in an enterprise system to disrupt, the one or more targets comprising at least one of a hardware resource of a plurality of hardware resources in the enterprise system and a software component of a plurality of software components in the enterprise system, wherein at least a portion of the plurality of hardware resources implement the plurality of software components" one or more targets in an enterprise system to disrupt may be determined. The one or more targets may include at least one of a hardware resource of a plurality of hardware resources in the enterprise system and a software component of a plurality of software components in the enterprise system. Further, at least a portion of the plurality of hardware resources may implement the plurality of software components. For example, disruption manager 204 may determine a hardware component and a software component of enterprise system 202 to disrupt.

Continuing to block 532 "identify one or more disruptions to apply to each of the one or more targets, wherein each of the one or more disruptions affect operation of at least one of the one or more targets in the enterprise system" one or more disruptions to apply to each of the one or more targets may be identified. For example, constructor 310 may identify one or more disruptions 332 to apply to targets 330. Proceeding to block 534 "determine one or more conditions for each of the one or more disruptions to apply to each of the one or more targets" one or more conditions for each of the one or more disruptions may be determined for application to each of the one or more targets. For instance, constructor 310 may determine one or more conditions 334 for each of the one or more disruptions 332 for application to targets 330.

At block 536 "analyze at least one of the one or more targets, the one or more disruptions, and the one or more conditions to determine one or more timings for the one or more disruptions" one or more timings may be determined for the one or more disruptions based on analysis of at least one of the one or more targets, the one or more disruptions, and the one or more conditions. For example, constructor 310 may determine one or more timings 338 based on analysis of at least one of the one or more targets 330, the one or more disruptions 332, and the one or more conditions 334.

Referring to block 538 "create a disruption scheme for the enterprise system based on the one or more targets, the one or more disruptions, the one or more conditions, and the one or more timings" a disruption scheme for the enterprise system may be created based on the one or more targets, the one or more disruptions, the one or more conditions, and the one or more timings. For instance, constructor 310 may generate disruption scheme 340 based on the one or more targets 330, the one or more disruptions 332, the one or more conditions 334, and the one or more timings 338.

Continuing to block 540 "implement the disruption scheme on the enterprise system to test resiliency of the enterprise system" the disruption scheme may be implemented in the enterprise system to test the resiliency of the enterprise system. For example, disruptor 312 may implement disruption scheme 340 to test the resiliency of enterprise system 202. Proceeding to block 542 "monitor the one or more disruptions and one or more responses to the one or more disruptions" the one or more disruptions and the one or more responses to the disruptions may be monitored. For instance, disruption monitor 214 may monitor the one or more disruptions and response monitor 216 may monitor the one or more responses.

At block 544 "create at least one disruption event in a library based on monitoring the one or more disruptions and the one or more responses to the one or more disruptions" at least one disruption event may be created in a library based on monitoring the one or more disruptions and the one or more responses to the one or more disruptions. For example, disruption manager 404 may create one or more disruption event records 448 in library 406 based on monitoring the one or more disruptions and the one or more responses to the one or more disruptions. In some embodiments, library builder 218 may create one or more disruption event records in library 206 based on monitoring the one or more disruptions and the one or more responses to the one or more disruptions.

Figure 6:
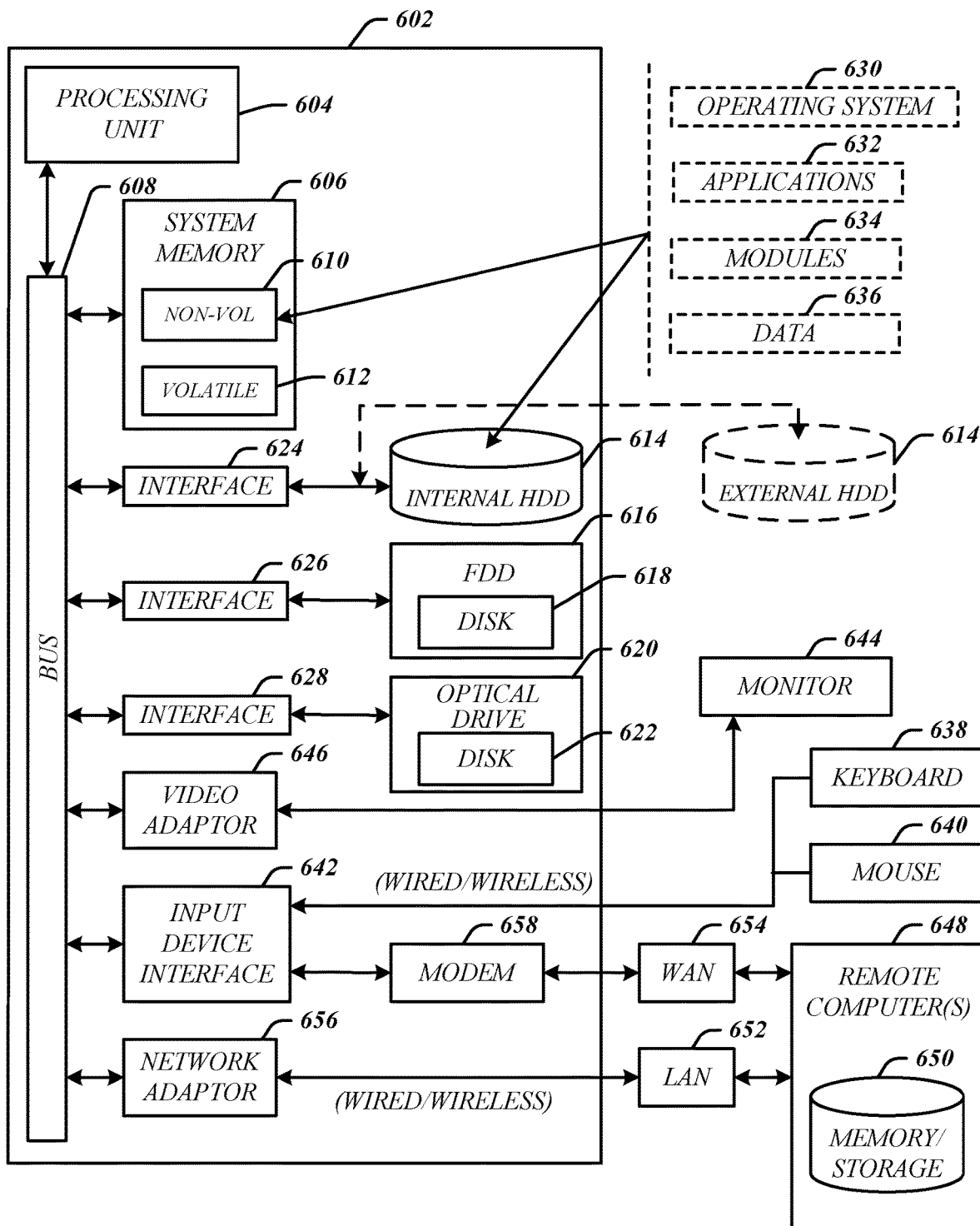
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more portions of components and/or techniques described herein, such as enterprise system 102, disruption manager 104, and/or library 106. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
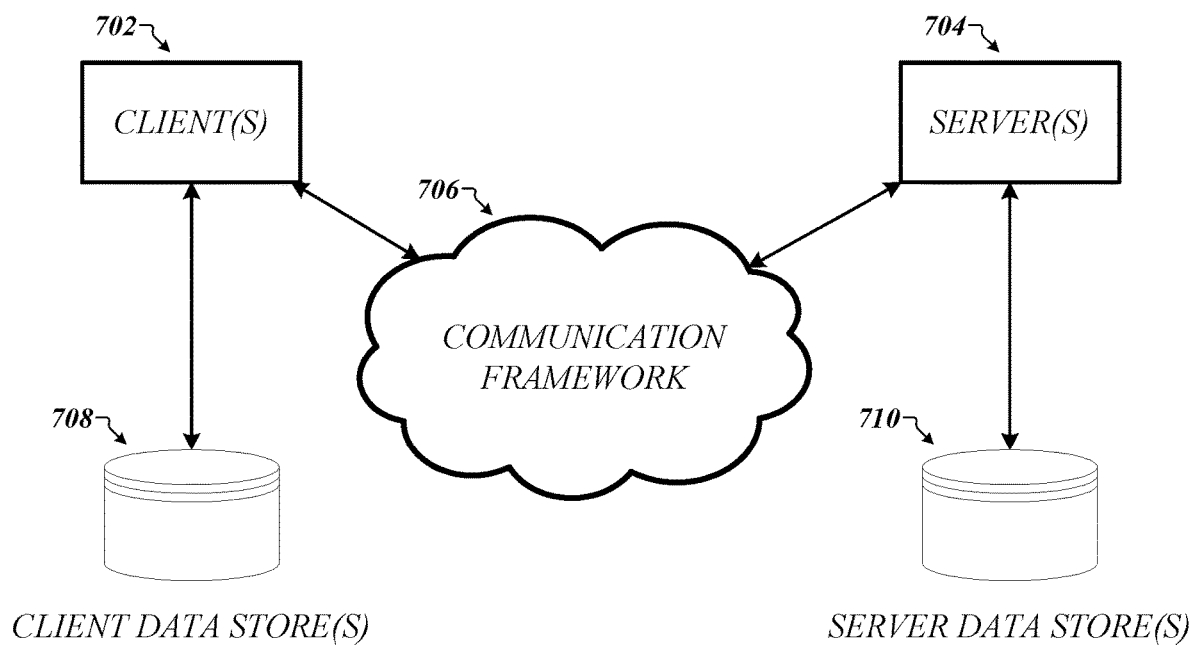
FIG. 7 illustrates exemplary aspects of a communications architecture according to one or more embodiments described herein.

FIG. 7 illustrates a block diagram of an exemplary communications architecture 700 suitable for implementing various embodiments, techniques, interactions, and/or components described herein, such as enterprise system 102, disruption manager 104, and/or library 106. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:
a processor; and
memory comprising instructions that when executed by the processor cause the processor to:
implement a disruption scheme to an initial configuration of an enterprise system to test the enterprise system, the disruption scheme comprising one or more disruptions and the enterprise system comprising a plurality of components;
monitor the one or more disruptions and one or more responsive actions taken in response to the one or more disruptions;
determine at least one remedying action of the one or more responsive actions that remedied at least one of the one or more disruptions;
monitor for a threshold condition during the disruption scheme, the threshold condition comprising at least one of:
a number of affected components of the plurality of components affected by the disruption scheme exceeds a components threshold, or
an elapsed time with affected components exceeds a time threshold;
return the enterprise system to the initial configuration responsive to detection of the threshold condition; and
create at least one disruption event in a library based on monitoring the one or more disruptions and the one or more responsive actions taken in response to the one or more disruptions, the at least one disruption event comprising a system state timeline, a response timeline, a configuration timeline, and the at least one remedying action, wherein the response timeline comprises a first mapping, over time, of the one or more responsive actions, including failover operations or auxiliary resources being deployed, taken in response to the one or more disruptions, and wherein the configuration timeline includes a second mapping of changes over time of data sources and respective destinations for one or more components in in the enterprise system;
wherein the first mapping includes one or more nodes and one or more edges, each node representing a software or hardware component of the enterprise system and each edge representing connections, including data paths, between the software or hardware components.

2. The apparatus of claim 1, wherein the one or more responsive actions include failover operations; and
wherein the threshold condition comprises the number of affected components of the plurality of components affected by the disruption scheme exceeds a components threshold.

3. The apparatus of claim 1, wherein the one or more responsive actions include deployment of auxiliary resources.

4. The apparatus of claim 1, wherein the system state timeline comprises a third mapping, over time, of an operational state over time of at least one component in the enterprise system.

5. The apparatus of claim 4, wherein the operational state includes one or more of a health status, a capacity, a bandwidth, a load, and a traffic flow.

6. The apparatus of claim 1, wherein the configuration timeline further comprises:
a fourth mapping, over time, of interdependencies between two or more components in the enterprise system; and
settings of the one or more components and how the settings change over time.

7. At least one non-transitory computer-readable medium comprising a set of instructions that, in response to being executed by a processor circuit, cause the processor circuit to:
implement a disruption scheme to an initial configuration of an enterprise system to test the enterprise system, the disruption scheme comprising one or more disruptions and the enterprise system comprising a plurality of components;
monitor the one or more disruptions and one or more responsive actions taken in response to the one or more disruptions;
determine at least one remedying action of the one or more responsive actions that remedied at least one of the one or more disruptions;
monitor for a threshold condition during the disruption scheme, the threshold condition comprising at least one of:
a number of affected components of the plurality of components affected by the disruption scheme exceeds a components threshold, or
an elapsed time with affected components exceeds a time threshold;
return the enterprise system to the initial configuration responsive to detection of the threshold condition; and
create at least one disruption event in a library based on monitoring the one or more disruptions and the one or more responsive actions taken in response to the one or more disruptions, the at least one disruption event comprising a system state timeline, a response timeline, a configuration timeline, and the at least one remedying action, wherein the response timeline comprises a first mapping, over time, of the one or more responsive actions, including failover operations or auxiliary resources being deployed, taken in response to the one or more disruptions, and wherein the configuration timeline includes a second mapping of changes over time of data sources and respective destinations for one or more components in in the enterprise system;
wherein the first mapping includes one or more nodes and one or more edges, each node representing a software or hardware component of the enterprise system and each edge representing connections, including data paths, between the software or hardware components.

8. The at least one non-transitory computer-readable medium of claim 7, wherein the one or more responsive actions include failover operations; and
wherein the threshold condition comprises the number of affected components of the plurality of components affected by the disruption scheme exceeds a components threshold.

9. The at least one non-transitory computer-readable medium of claim 7, wherein the one or more responsive actions include deployment of auxiliary resources.

10. The at least one non-transitory computer-readable medium of claim 7, wherein the system state timeline comprises a third mapping, over time, of an operational state over time of at least one component in the enterprise system.

11. The at least one non-transitory computer-readable medium of claim 10, wherein the operational state includes one or more of a health status, a capacity, a bandwidth, a load, and a traffic flow.

12. The at least one non-transitory computer-readable medium of claim 7, wherein the configuration timeline comprises:
   a fourth mapping, over time, of interdependencies between two or more components in the enterprise system; and
   settings of the one or more components and how the settings change over time.

13. A computer-implemented method, comprising:
   implementing a disruption scheme to an initial configuration of an enterprise system to test the enterprise system, the disruption scheme comprising one or more disruptions and the enterprise system comprising a plurality of components;
   monitoring the one or more disruptions and one or more responsive actions taken in response to the one or more disruptions;
   determining at least one remedying action of the one or more responsive actions that remedied at least one of the one or more disruptions;
   monitoring for a threshold condition during the disruption scheme, the threshold condition comprising at least one of:
      a number of affected components of the plurality of components affected by the disruption scheme exceeds a components threshold, or
      an elapsed time with affected components exceeds a time threshold;
   returning the enterprise system to the initial configuration responsive to detection of the threshold condition; and
   creating at least one disruption event in a library based on monitoring the one or more disruptions and the one or more responsive actions taken in response to the one or more disruptions, the at least one disruption event comprising a system state timeline, a response timeline, a configuration timeline, and the at least one remedying action, wherein the response timeline comprises a first mapping, over time, of the one or more responsive actions, including failover operations or auxiliary resources being deployed, taken in response to the one or more disruptions, and wherein the configuration timeline includes a second mapping of changes over time of data sources and respective destinations for one or more components in in the enterprise system;
   wherein the first mapping includes one or more nodes and one or more edges, each node representing a software or hardware component of the enterprise system and each edge representing connections, including data paths, between the software or hardware components.

14. The computer-implemented method of claim 13, wherein the one or more responsive actions include failover operations; and
   wherein the number of affected components of the plurality of components affected by the disruption scheme exceeds a components threshold.

15. The computer-implemented method of claim 13, wherein the one or more responsive actions include deployment of auxiliary resources.

16. The computer-implemented method of claim 13, wherein the system state timeline comprises a third mapping, over time, of an operational state over time of at least one component in the enterprise system.

17. The computer-implemented method of claim 16, wherein the operational state includes one or more of a health status, a capacity, a bandwidth, a load, and a traffic flow.

18. The apparatus of claim 1, wherein a timing for implementing the disruption scheme is determined based on historical operational data of a corresponding enterprise system.

19. The at least one non-transitory computer-readable medium of claim 7, wherein a timing for implementing the disruption scheme is determined based on historical operational data of a corresponding enterprise system.

20. The computer-implemented method of claim 13, wherein a timing for implementing the disruption scheme is determined based on historical operational data of a corresponding enterprise system.

* * * * *